Figure 1:
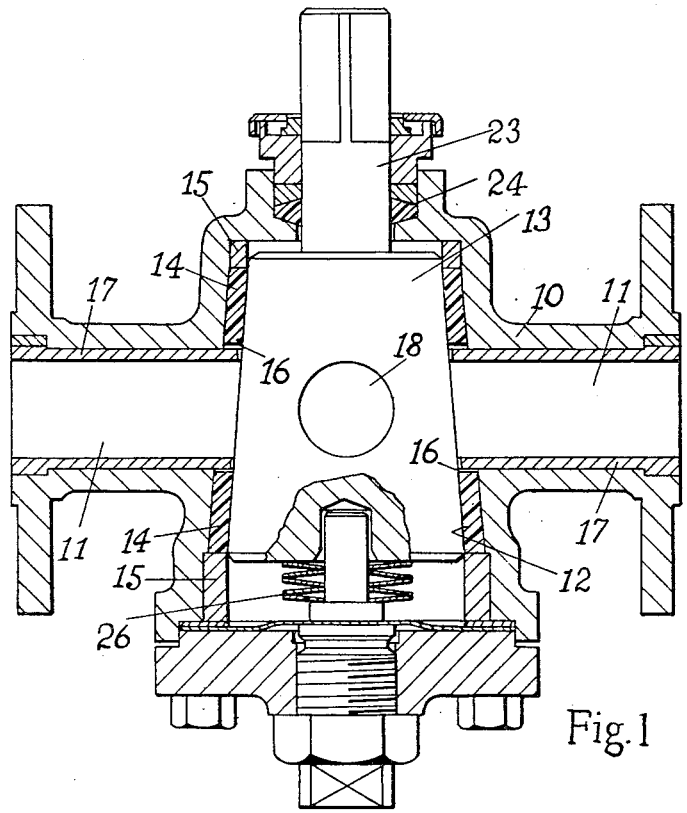

May 21, 1963　　　T. J. FLOYD　　　3,090,594
VALVES HAVING SEALING MEANS RESTRAINED AGAINST AXIAL EXPANSION
Filed Dec. 19, 1960　　　2 Sheets-Sheet 1

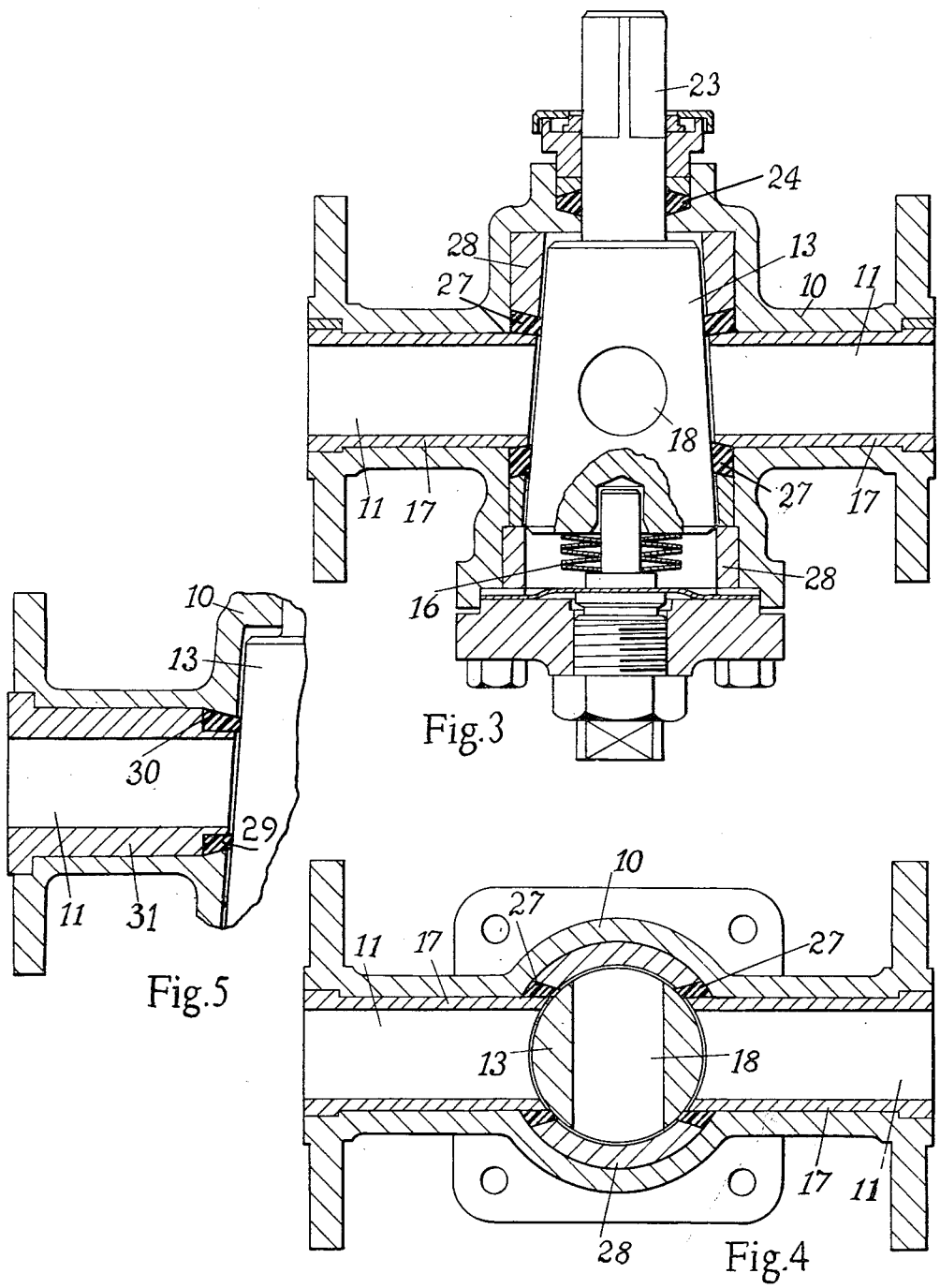

United States Patent Office 3,090,594
Patented May 21, 1963

3,090,594
VALVES HAVING SEALING MEANS RESTRAINED AGAINST AXIAL EXPANSION
Terence John Floyd, Wellington, England, assignor to Audley Engineering Company Limited, Shropshire, England
Filed Dec. 19, 1960, Ser. No. 76,668
Claims priority, application Great Britain Jan. 5, 1960
8 Claims. (Cl. 251—183)

This invention relates to valves for controlling the flow of fluids and which are of the kind having a rotatable tapered plug mounted in a valve body provided with ports, the tapered plug being rotatable between a position in which communication is established through the plug between said ports and a position in which such communication is interrupted.

In certain applications of such valves (e.g. valves used for controlling the flow of corrosive fluids) difficulties are sometimes experienced in preventing galling and seizing between the plug and valve body. For example, where lubricant is used in the form of a thin film spread over the surface of the plug, the operating conditions of temperature or pressure or the nature of the fluid flowing through the valve may be such as to cause the lubricant film to break down.

The object of the present invention is to provide a new or improved construction in which the aforementioned disadvantage is obviated or reduced.

In accordance with the invention there is provided a fluid controlling valve of the kind having a rotatable tapered plug which is mounted in a valve body having ports for conveying fluid to and from the valve, wherein at least part of the sealing surface between the plug and the valve body is formed from a synthetic resin material having a low coefficient of friction, said material being shaped and supported in the valve so as to be restrained against expansion in a direction parallel to the adjacent part of the peripheral surface of the tapered plug, and resilient means being provided for urging said tapered plug into sealing engagement with its seating, the arrangement being such that any expansion or contraction of said synthetic resin material in a radial direction with respect to the rotational axis of the plug can be accommodated by small axial movements of said plug.

With the above described arrangement, there may be provided a sleeve which is formed of the aforesaid synthetic resin material having a low coefficient of friction and through which the rotatable plug extends there being also provided an abutment surface for supporting the sleeve at each axial end thereof and a plurality of suporting elements which respectively engage and support the peripheries of a corresponding number of apertures formed in the sleeve intermediate its ends.

Alternatively instead of providing a sleeve formed of the synthetic resin material as above mentioned each of the ports provided in the valve body may be provided with an annular insert of the synthetic resin material having a low coefficient of friction, each of said inserts being mounted in a rigid sleeve through which the rotatable tapered plug extends, said sleeve engaging and supporting the outer periphery of the insert and each insert being arranged so that one of its axial ends engages the peripheral surface of the rotatable tapered plug and forms a sealing surface therefor.

Conveniently the synthetic resin material having a low coefficient of friction is a substance such as polytetrafluoroethylene (hereafter referred to as p.t.f.e.) formed from ethylene chloride and its derivatives in combination with fluorine.

Figure 2:
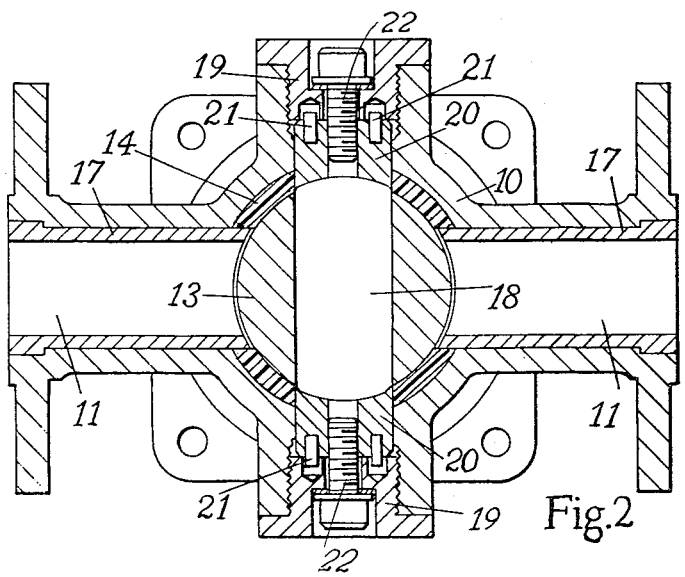

The invention will now be more particularly described with reference to the accompanying drawings wherein FIGURES 1 and 2 are respectively a sectional side elevation and plan view of one form of valve constructed in accordance with the present invention. FIGURES 3 and 4 are respectively a sectional side elevation and plan view of an alternative construction and FIGURE 5 is a fragmentary sectional side elevation illustrating a modification of the valve shown in FIGURES 3 and 4.

Referring firstly to FIGURES 1 and 2 the valve shown therein includes a valve body 10 having ports 11 which serve as an inlet and an outlet. Said body 10 is provided with a frusto-conical socket 12 and within the socket is disposed a rotatable tapered plug 13 also formed to a frusto-conical configuration.

The plug 13 is somewhat smaller than the associated socket 12 and in the annular space between the plug and the body is mounted a sleeve 14 of tubular frusto-conical form, said sleeve being formed of synthetic resin material having a low coefficient of friction such as the material commonly known as p.t.f.e. The sleeve 14 is stationarily mounted in the body 10 and a pair of metallic support rings 15 disposed at the two axial ends of the sleeve 14 provide abutment surfaces which restrain the sleeve against expansion in an axial direction.

The sleeve 14 is provided with a pair of apertures 16 Uwhich are aligned with the inlet and outlet ports 11 and each of said ports is also provided with a supporting element in the form of a tubular liner 17 which is formed of metal and which projects at one axial end into the aforementioned associated aperture 16. Thus each liner 17 will prevent sleeve material adjacent to the associated aperture 16 from flowing into the adjacent port of the valve body.

The valve plug 13 is provided with a fluid passage 18 which can either be aligned with the port 11 of the body in the open position of the valve or alternatively the plug can be rotated from a position shown in the drawings in which said passage 18 is not aligned with the ports so that the valve is then in a closed position. If the p.t.f.e. material were to extend over the ends of the passage 18 when the latter is in its closed position there might be a tendency in certain circumstances for such material to flow inwardly into said passage and accordingly in order to preclude the possibility of this happening the rigid reinforcing member is inserted into the sleeve at these positions. Such reinforcement is illustrated in FIGURE 2 wherein it will be seen that on each side of the valve there is provided an outer flanged portion 19 and an inner portion 20 which is located with respect to the outer portion by means of dowel pins 21, the two portions being secured together by a central bolt 22.

One end of the rotatable plug 13 is provided with a stem 23 which projects through the valve body and which can be used for the purpose of rotating the plug between its open and closed positions. Sealing means are provided between said stem 23 and the valve body and said means incorporate one or more rings 24 of p.t.f.e. material, each ring 24 having at least one axial end face formed to a frusto-conical configuration so that it may be expanded in a radial direction to form a seal by means of axially-applied pressure.

At the end of the plug 13 opposite to said stem 23 are provided resilient means in the form of a stack of spring washers 26, said resilient means being arranged to exert an inward axial force on the plug so as to maintain said plug in sealing engagement with the seating formed by the interior of the sleeve 14. Thus as the sleeve 14 is restrained against axial expansion any expansion or flow of the sleeve material will be in a radial direction and the low coefficient of friction between the sleeve and the plug may cause the latter to move outwardly against the pressure exerted by the resilient means 26 when the sleeve material expands. When said material contracts again the plug 13 will then move inwardly under the influence of said resilient means so that sealing engagement is maintained between the plug and the interior face of the sleeve. The sleeve 14 may of course expand owing to the application of heat supplied by a fluid flowing through the valve but the above described arrangement enables advantage to be taken of the low friction properties of p.t.f.e. material whilst at the same time avoiding the disadvantages that might otherwise stem from uncontrolled flow of the material.

Referring now to FIGURES 3 and 4 the arrangement shown therein is similar in many respects to that shown in FIGURES 1 and 2 and like parts are referred to by like reference numerals. In this case however, in order to economise in the use of p.t.f.e. material such material is limited to annular inserts 27, an insert being provided in association with each of ports 11 as shown. Each insert 27 is thus formed from p.t.f.e. material and engages at one axial end with the peripheral surface of the plug 13, the opposite axial end engaging the valve body 10. Furthermore the exterior surface of each insert 27 is formed to a frusto-conical configuration and is engaged and supported by a metal sleeve 28. The interior of each insert 27 is supported by a liner 17 as before, said liner projecting at one axial end into the insert.

In the modification of this last described construction shown in FIGURE 5 each insert (one being shown and indicated by reference numeral 29) engages the peripheral surface of the plug 13 at one axial end and at the other axial end is supported by a shoulder 30 formed in a metal liner 31 inserted in the port 11 of the valve. The insert 29 is formed as before of p.t.f.e. material and has its external surface formed to a frusto-conical configuration, said external surface being supported by the valve body 10 so that once again said insert is restrained against expansion in a direction parallel to the adjacent surface of the plug.

Having thus described my invention what I claim as new and desire to secure by Letters Patent is:

1. A fluid controlling valve having in combination a hollow body provided with an internal socket of circular cross-section, and with a pair of coaxial fluid inlet and outlet ports extending from opposite sides respectively of a portion of said socket intermediate the ends thereof, a rotatable and axially movable closure member in the form of a frusto-conical plug mounted coaxially within said socket in spaced relationship thereto, and provided with a transverse fluid passage for establishing communication between said ports when said plug occupies an open position, sealing means mounted within said hollow body in contact with the outer peripheral surface of said plug, and consisting of a synthetic resin material having a low coefficient of friction, means isolating said sealing means from said inlet and outlet ports, and resilient means acting on said plug in the direction for urging it into constant contact with said sealing means so that expansion or contraction of the latter in a radial direction relative to the rotational axis of said plug will be accompanied by small axial movement of said plug, said sealing means being shaped and supported within said hollow body so as to be restrained against expansion in a direction parallel with the adjacent parts of the outer peripheral surface of said plug.

2. A fluid controlling valve according to claim 1, and comprising in combination a sleeve which constitutes the sealing means, and which is mounted, with the plug extending therethrough, within the internal socket of the hollow body, said sleeve being provided intermediate its ends with a pair of apertures coaxial with, and respectively adjacent the inner ends of, the inlet and outlet ports, a pair of hollow elements which constitute the means isolating said sealing means from said ports, and which respectively engage the peripheries of said apertures, and a pair of annular abutments which are mounted within said internal socket at opposite ends respectively of said sleeve, and which serve to support the ends of said sleeve.

3. A fluid controlling valve according to claim 2, wherein the hollow elements respectively engaging the peripheries of the apertures in the sleeve, have the form of tubular liners which are mounted respectively in the inlet and outlet ports, and which at their inner ends extend respectively into said apertures.

4. A fluid controlling valve according to claim 3, and having a pair of rigid reinforcing members which are carried by the hollow body, and which extend respectively into, and close, additional apertures formed in the sleeve at positions in which said reinforcing members are situated adjacent opposite ends respectively of the transverse fluid passage in the plug when the latter occupies a closed position.

5. A fluid controlling valve according to claim 1, and comprising in combination a rigid sleeve which is mounted, with the plug extending therethrough, within the internal socket in the hollow body, said sleeve being provided intermediate its ends with a pair of apertures coaxial with, and respectively adjacent, the inner ends of the inlet and outlet ports, a pair of annular inserts which are respectively mounted within said apertures, and which constitute the sealing means, and a pair of tubular liners which are mounted respectively in the inlet and outlet ports, and which at their inner ends extend respectively into said annular inserts, and constitute the means isolating said sealing means from said ports.

6. A fluid controlling valve according to claim 5, wherein the ends of the annular inserts remote from the plug are in contact with adjacent parts of the hollow body, and the inner peripheries of the annular inserts are respectively in contact with, and supported by, the inner ends of the tubular liners.

7. A fluid controlling valve according to claim 1, and comprising in combination a pair of annular inserts which are mounted coaxially with, and respectively surround, the inner end of the inlet and outlet ports, and which constitute the sealing means, and a pair of tubular liners which are mounted respectively in said ports, and which at their inner ends extend respectively into, and support, said annular inserts, said tubular liners being provided near their inner ends with shoulders which are respectively in contact with, and support, the ends of said annular inserts remote from the plug.

8. A fluid controlling valve according to claim 1, and comprising in combination with a stem extending coaxially from one end of the plug through the adjacent part of the hollow body, additional sealing means situated between said stem and hollow body, and incorporating at least one ring which is made of a synthetic resin material having a low coefficient of friction, and which has at least one end face of frusto-conical form so that it can be expanded in a radial direction relative to said stem by axially applied pressure.

References Cited in the file of this patent

UNITED STATES PATENTS

| | | |
|---|---|---|
| 195,707 | Dewrance | Oct. 2, 1877 |
| 1,086,221 | Reynolds | Feb. 3, 1914 |
| 1,800,552 | Martin | Apr. 14, 1931 |
| 2,210,335 | Mueller | Aug. 6, 1940 |
| 2,728,551 | Blackman | Dec. 27, 1955 |
| 2,729,420 | Schenck | Jan. 3, 1956 |
| 2,776,104 | Sinkler | Jan. 1, 1957 |
| 2,864,579 | Stoltenberg | Dec. 16, 1958 |
| 2,973,183 | Alger | Feb. 28, 1961 |
| 2,986,374 | Rakus | May 30, 1961 |